(12) United States Patent
Lee et al.

(10) Patent No.: US 10,863,480 B2
(45) Date of Patent: *Dec. 8, 2020

(54) POWER SAVING METHOD IN WIRELESS COMMUNICATION SYSTEM

(71) Applicant: Electronics and Telecommunications Research Institute, Daejeon (KR)

(72) Inventors: Il-Gu Lee, Seoul (KR); Sok-Kyu Lee, Daejeon (KR); Hyun-Kyu Chung, Daejeon (KR); Dae-Sik Kim, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,879

(22) Filed: Mar. 2, 2018

(65) Prior Publication Data

US 2018/0192377 A1    Jul. 5, 2018

Related U.S. Application Data

(63) Continuation of application No. 15/231,786, filed on Aug. 9, 2016, now abandoned, which is a
(Continued)

(30) Foreign Application Priority Data

Oct. 28, 2009  (KR) .................. 10-2009-0103008

(51) Int. Cl.
*H04W 72/04* (2009.01)
*H04L 1/00* (2006.01)
(Continued)

(52) U.S. Cl.
CPC ....... *H04W 72/0406* (2013.01); *H04L 1/0002* (2013.01); *H04L 1/0006* (2013.01); *H04W 24/02* (2013.01); *H04W 74/002* (2013.01)

(58) Field of Classification Search
CPC ............ H04W 24/02; H04W 72/0406; H04W 74/002; H04L 1/0002; H04L 1/0006
See application file for complete search history.

(56) References Cited

U.S. PATENT DOCUMENTS

| 8,411,698 B2 | 4/2013 | Lee et al. |
| 8,532,221 B2 | 9/2013 | Liu et al. |

(Continued)

FOREIGN PATENT DOCUMENTS

| CN | 1694559 A | 11/2005 |
| CN | 1716956 A | 1/2006 |

(Continued)

OTHER PUBLICATIONS

International Search Report for PCT/KR201 0/007494 filed on Oct. 28, 2010.
(Continued)

*Primary Examiner* — Kevin C. Harper

(57) ABSTRACT

A method and apparatus of accessing a channel in a wireless local area network is provided. A destination station receives a request to send (RTS) frame to allocate a network allocation vector from a source station over a first bandwidth and transmits a clear to send (CTS) frame over a second bandwidth to the source station in response to the RTS frame. The second bandwidth is dynamically determined when a first parameter has a predetermined value.

60 Claims, 9 Drawing Sheets

Related U.S. Application Data continuation of application No. 13/779,475, filed on Feb. 27, 2013, now Pat. No. 9,432,940, which is a continuation of application No. 13/458,940, filed on Apr. 27, 2012, now Pat. No. 8,411,698, which is a continuation of application No. PCT/KR2010/007494, filed on Oct. 28, 2010.

(51) Int. Cl.
*H04W 74/00* (2009.01)
*H04W 24/02* (2009.01)

(56) References Cited

U.S. PATENT DOCUMENTS

| | | | |
|---|---|---|---|
| 8,576,872 | B2 | 11/2013 | Agrawal et al. |
| 8,737,405 | B2* | 5/2014 | Liu ................. H04W 24/02 370/395.21 |
| 8,787,385 | B2 | 7/2014 | Liu |
| 8,913,510 | B2 | 12/2014 | Gong |
| 8,989,158 | B2 | 3/2015 | Seok |
| 9,025,544 | B2 | 5/2015 | Kim |
| 9,271,309 | B2 | 2/2016 | Kim |
| 2003/0086437 | A1 | 5/2003 | Benveniste |
| 2004/0042424 | A1 | 3/2004 | Hsien-Tsung |
| 2005/0152465 | A1 | 7/2005 | Maltsev |
| 2005/0190724 | A1 | 9/2005 | Hansen et al. |
| 2006/0227802 | A1 | 10/2006 | Du et al. |
| 2006/0280155 | A1 | 12/2006 | Kwon et al. |
| 2007/0081485 | A1 | 4/2007 | Li et al. |
| 2007/0160040 | A1 | 7/2007 | Kown |
| 2007/0230378 | A1 | 10/2007 | Tavares et al. |
| 2007/0297353 | A1 | 12/2007 | Habetha et al. |
| 2008/0080553 | A1* | 4/2008 | Hasty ................. H04L 1/0002 370/468 |
| 2008/0144493 | A1 | 6/2008 | Yeh |
| 2009/0059891 | A1 | 3/2009 | Sakoda et al. |
| 2009/0086706 | A1 | 4/2009 | Huang |
| 2009/0225727 | A1* | 9/2009 | Chen ................. H04W 28/06 370/337 |
| 2010/0054230 | A1 | 3/2010 | Sridhara et al. |
| 2010/0260159 | A1 | 10/2010 | Zhang et al. |
| 2011/0038262 | A1 | 2/2011 | Nabetani et al. |
| 2011/0038358 | A1 | 2/2011 | Wang et al. |
| 2011/0051647 | A1 | 3/2011 | Sampath et al. |
| 2011/0194542 | A1 | 8/2011 | Kim et al. |
| 2012/0014336 | A1 | 1/2012 | Seok et al. |
| 2012/0051334 | A1 | 3/2012 | Sridhara et al. |
| 2012/0082040 | A1 | 4/2012 | Gong et al. |
| 2012/0243485 | A1 | 9/2012 | Merlin et al. |
| 2012/0320856 | A1 | 12/2012 | Kim et al. |
| 2015/0373587 | A1* | 12/2015 | Josiam ................. H04L 5/0064 370/338 |

FOREIGN PATENT DOCUMENTS

| | | |
|---|---|---|
| CN | 1949913 A | 4/2007 |
| CN | 101345749 A | 1/2009 |
| CN | 101496350 A | 7/2009 |
| CN | 101510821 A | 8/2009 |
| CN | 101527664 A | 9/2009 |
| JP | 2003-348635 A | 12/2003 |
| JP | 2003-348641 A | 12/2003 |
| JP | 2006-157733 A | 6/2006 |
| JP | 2007-532040 A | 11/2007 |
| JP | 2009-005313 A | 1/2009 |
| JP | 2009-523352 A | 6/2009 |
| JP | 2009-171506 A | 7/2009 |
| KR | 1020020063963 A | 8/2002 |
| KR | 1020070072983 A | 7/2007 |
| KR | 1020080042728 A | 5/2008 |
| KR | 10-2009-0090668 A | 8/2009 |
| KR | 1020100068872 A | 6/2010 |
| WO | 2006/120979 A1 | 11/2006 |
| WO | 2006/132511 A1 | 12/2006 |
| WO | 2007/021158 A1 | 2/2007 |
| WO | 2007/081130 A1 | 7/2007 |
| WO | 2009/093404 A1 | 7/2009 |
| WO | 2009/154406 A2 | 12/2009 |

OTHER PUBLICATIONS

Extended European Search Report for International Application No. PCT/KR201 0007494 dated Dec. 19, 2012.
Office Action dated Aug. 17, 2012 in U.S. Appl. No. 13/458,940.
Notice of Allowance dated Jan. 11, 2013 in U.S. Appl. No. 13/458,940.
Office Action dated Jun. 23, 2014 in U.S. Appl. No. 13/779,475.
Office Action dated Dec. 4, 2014 in U.S. Appl. No. 13/779,475.
Office Action dated Apr. 9, 2015 in U.S. Appl. No. 13/779,475.
Office Action dated Aug. 27, 2015 in U.S. Appl. No. 13/779,475.
Notice of Allowance dated May 4, 2016 in U.S. Appl. No. 13/779,475.
"Channelization for 11ac," TGac doc. IEEE 802.11-10/1064r2, by Kim et al. ("IEEE 802.11-10/1064r2"), Sep. 14, 2010.
"RTS&CTS Exchange in wideband transmission," TGac doc. IEEE 802.11-10/1066r2, by Nan et al. ("IEEE 802.11-10/1066r2"), Sep. 15, 2010.
"Specification Framework for TGac," TGac doc. IEEE 802.11-09/0992r15 by Stacey et al. ("IEEE 802.11-09/0992r15"), Sep. 2010.
Defendant's Preliminary Invalidity Contentions submitted on Jul. 22, 2019 for Case No. 2:18-cv-00526 (E.D. Texas).
Intervenor Ericsson Inc.'s Preliminary Invalidity Contentions submitted on Jul. 22, 2019 for Case No. 2:18-cv-00526 (E.D. Texas).
Exhibits T-1 to T-7 to Defendant's Preliminary Invalidity Contentions submitted on Jul. 22, 2019 for Case No. 2:18-cv-00526 (E.D. Texas).
Appendix T to Defendant's Preliminary Invalidity Contentions submitted on Jul. 22, 2019 for Case No. 2:18-cv-00526 (E.D. Texas).
U.S. Appl. No. 61/407,269 ("Liu '269"), published with, e.g., U.S. Pat. No. 8,787,385 on Jul. 22, 2014.

* cited by examiner

POWER SAVING METHOD IN WIRELESS COMMUNICATION SYSTEM

CROSS REFERENCE TO RELATED APPLICATIONS

The present application is a continuation of U.S. patent application Ser. No. 15/231,786, filed on Aug. 9, 2016, which is a continuation of U.S. patent application Ser. No. 13/779,475, filed on Feb. 27, 2013, which is a continuation of U.S. patent application Ser. No. 13/458,940, filed on Apr. 27, 2012, now U.S. Pat. No. 8,411,698, which is a continuation of patent application number PCT/KR2010/007494, which claims priority of Korean patent application number 10-2009-0103008, filed on Oct. 28, 2009, which are incorporated by reference in their entirety.

TECHNICAL FIELD

Exemplary embodiments of the present invention relate to a method for increasing resource utilization of a high-rate wireless communication system and reducing power consumption, and a controlling apparatus therefor.

BACKGROUND ART

As a wireless communication system has been advanced and a demand for portably available high-capacity multimedia contents has been increased, many efforts have been made to increase a data transfer rate of a wireless communication system. Representative examples are a Wibro which can use the Internet during a high-speed movement, and a wireless LAN which can watch high-quality images during a low-speed movement in real time. A wireless LAN will be exemplarily described. The IEEE 802.11a/g standard supports a 54 Mbps physical layer data rate through a single antenna at a 20-MHz bandwidth in a 2.4-GHz or 5-GHz band. The IEEE 802.11n standard supports up to four antennas and a 40-MHz bandwidth and thus supports a 600-Mbps physical layer data rate.

As the next generation wireless LAN for ensuring a higher data rate, a next version of the IEEE 802.11n standard is under discussion. In general, the IEEE 802.11n standard is called a high throughput (HT) mode, and the IEEE 802.11a/b/g mode is called a legacy mode. On the other hand, the standard which has been newly discussed in the IEEE 802.11ac/ad is called a very high throughput (VHT) mode.

To process high-rate data with high reliability, a recent wireless communication system has become more complicated, as compared to a conventional art. As a data rate improvement technique, a channel bonding technique which bonds multi-channels and transmits data over the bonded channels is applied. In addition, a higher order modulation scheme and channel coding scheme have been introduced. In addition to a technique which increases a data rate with the use of multi-antennas, a technique which simultaneously transmits data to multi-users has been researched and developed. Due to such a complicated transmission/reception technique, the size of a wireless communication system increases and the circuitry thereof becomes complicated. Furthermore, since data is transmitted using a wider bandwidth than a conventional art in order for a high-rate data transmission, the required operating frequencies of a digital-to-analog converter (DAC), an analog-to-digital converter (DAC), and a modem processor have been increased. On such a technical background, a power save design for a dynamic channel bandwidth utilization technique and a high-data-rate wireless communication system has become an important issue as a receiver optimization technique for efficiently using finite frequency resources and reducing noise.

In addition, a wireless LAN operates at a limited frequency band. A 160-MHz bandwidth (bonding of eight 20-MHz bands) is relatively very wide band. Accordingly, interference and coexistence problems may occur between stations which support various standards. Therefore, there is a need for a technique which optimizes a receiving end by informing stations of preceding information through a control frame prior to a data frame in order to detect a multi transfer mode frame with high reliability.

DISCLOSURE

Technical Problem

An embodiment of the present invention is directed to a transmission method which improves a technique for a power save design at both a physical layer and a MAC layer and improving the efficiency of a power save technique, and a controlling apparatus therefor.

Another embodiment of the present invention is directed to a method for improving power consumption efficiency by controlling the sampling rates of an ADC, a DAC, and a modem processor according to a channel bandwidth used in a next generation wireless LAN, and a controlling apparatus therefor.

Another embodiment of the present invention is directed to a method and apparatus for transmitting a control frame containing preceding information in order to reduce noise and optimize the architecture of a receiving end according to a kind of a frame to be received.

Technical Solution

In accordance with an embodiment of the present invention, a frame transmitting method in a wireless communication system having two or more different bandwidth transmission modes includes: transmitting channel state information or data frame mode information added to a request frame, upon transmission of a request frame; and generating and transmitting the data frame, based on the channel state information or the receivable data frame mode information contained in a response frame, upon reception of the response frame with respect to the request frame including the channel state information or the receivable data frame mode information from a reception node.

In accordance with another embodiment of the present invention, a power saving method in a wireless communication system having two or more different bandwidth transmission modes includes: receiving a control frame by setting the control frame to be received in a mode having the lowest sampling rate among the bandwidth modes, upon reception of the control frame; and transmitting/receiving a data packet by setting the data packet to be transmitted/received in a mode having the highest sampling rate in order for transmission/reception of the data packet after the control frame is received.

In accordance with another embodiment of the present invention, a power saving method in a wireless communication system which transmits/receives data through a carrier sensing includes: supplying power to only a timer for releasing the doze mode and interrupting the supply of power to an entire physical layer and an entire MAC layer in a doze mode in which the sensing carrier is unnecessary; supplying power to only a physical layer and a MAC layer necessary for the carrier sensing when the carrier sensing is required; and supplying power to only a path necessary for data transmission/reception when the data transmission/reception is required after the carrier sensing.

In accordance with another embodiment of the present invention, a power saving method in a wireless communication system which has two or more different transmission modes and transmits/receives data through a carrier sensing includes: supplying power to only a timer for releasing the doze mode and interrupting the supply of power to an entire physical layer and an entire MAC layer in a doze mode in which the sensing carrier is unnecessary; performing the carrier sensing in a mode having the lowest sampling rate among the different bandwidth modes, when the carrier sensing is required; and transmitting/receiving the data packet by setting the data packet to be transmitted/received in a mode having the highest data rate in order for transmission/reception of the data packet after the carrier sensing.

Advantageous Effects

In accordance with embodiments of the present invention, the power consumption efficiency can be improved by selectively changing the sampling rate of the station and the power supply block according to the frame format and the operation mode of the high-rate wireless communication system. In addition, the disadvantages of the power save mode using the control of the conventional MAC layer can be complemented. A wider bandwidth can be used and the power consumption efficiency of the next generation wireless LAN to be more complicated can be improved.

MODE FOR INVENTION

Figure 1A:
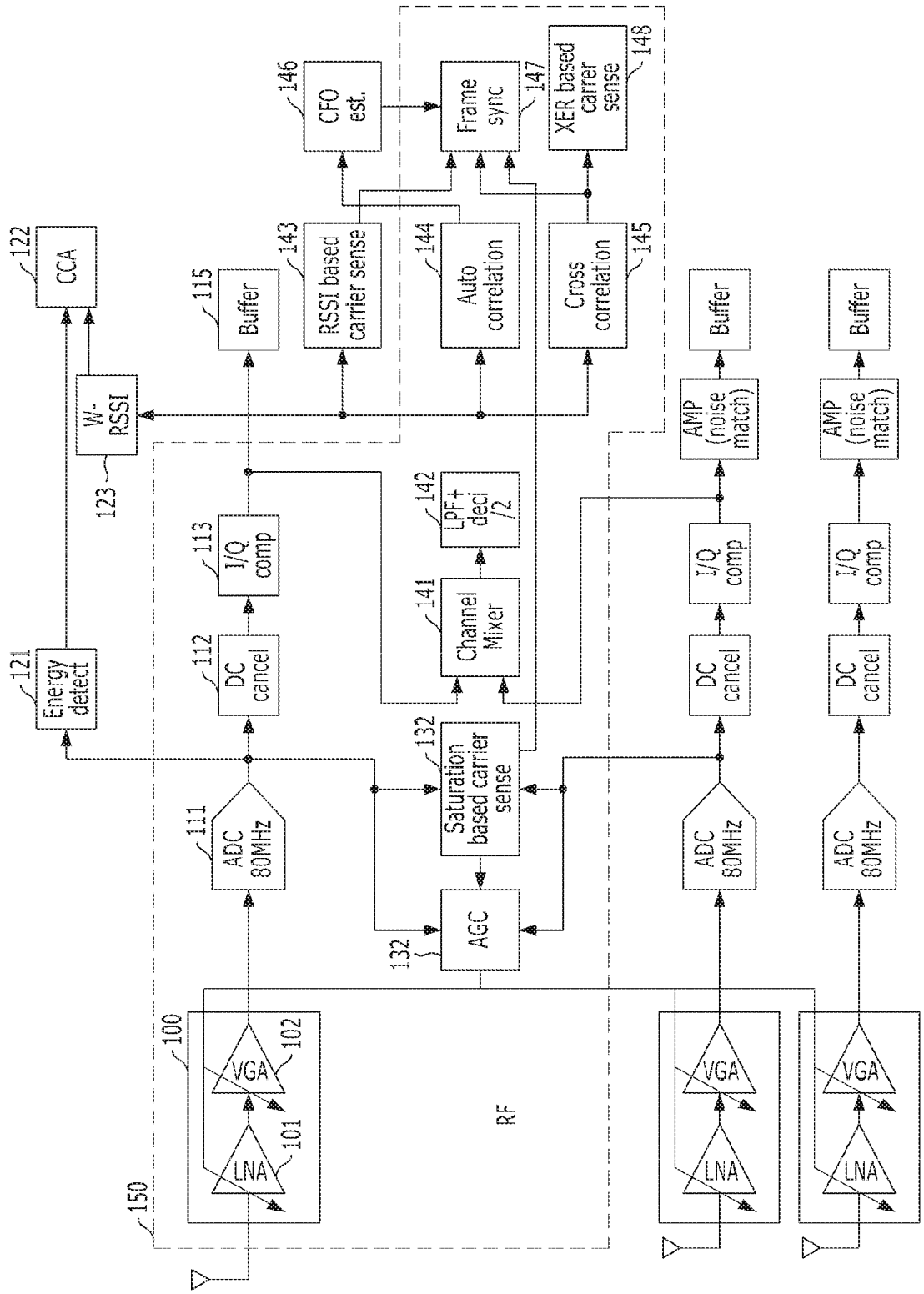
FIGS. 1A and 1B are block diagrams of a wireless communication station having three reception paths.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention relates to a method for improving power consumption efficiency for a high-rate wireless communication system, and a controlling technique therefor. The present invention is roughly divided into three parts. The respective parts can operate independently or interwork with one another. The first part is three cross layer power save mode, the second part is a transmission part for improving efficiency of a power save mode, and the third part is a power save technique using a multi-channel power save mode (MC PS mode) and a spatial multiplexing power save mode (SM PS mode).

First, power consumption (P) of a general CMOS circuit will be described below. The power consumption (P) of the CMOS circuit is modeled as expressed in as shown:

$$P = P_{Dynamic} + P_{Static} \quad \text{[Equation 1]}$$

$$= C \cdot V_{Sig} \cdot V_{DD} \cdot f_0 \cdot n_t + V_{DD} \cdot I_{Static} \cdot e^{\frac{V_{DD}}{pVT}}$$

where $P_{Dynamic}$ denotes a dynamic power consumption, $P_{Static}$ denotes a static power consumption, C denotes a switched total capacitance, $V_{Sig}$ denotes a voltage swing, $V_{DD}$ denotes a supply power, F0 denotes an operating frequency and $N_t$ denotes a number of transition of one flip-flop per clock.

According to Equation 1 above, $P_{Dynamic}$ is proportional to the switched total capacitance, the voltage swing, the supply power, the operating frequency, and the number of 'transition of one flip-flop per clock. In addition, $P_{Static}$ is determined by the residual current of the ground or the supply power, a thermal noise, and a current generated by a process. That is, $P_{Static}$ is an important factor in determining power consumption, but $P_{Static}$ is determined by a semiconductor fabrication process and an industry based technology, whereas $P_{Dynamic}$ is changed depending on a system design. In view of a system designer, reducing the dynamic power consumption is the target of a power save system design.

A VHT mode which is under discussion can use eight antennas or sixteen antennas and is very likely to support an 80-MHz bandwidth. For example, a multi-user multiple antenna technique can be applied in such a manner that an access point uses sixteen antennas and stations use four antennas. It is expected that a multi-channel transmission technique can be applied using a bandwidth of up to 160 MHz.

Therefore, a VHT standard station has two to eight times the antennas and bandwidth of the conventional standard station. The increase in the transmission paths due to the increased antennas means the increase in the size of the circuit and chip, which causes the increase in power consumption. In addition, the increase in the bandwidth used means the increase in the required operating frequency, which also causes the increase in the power consumption.

In the existing 802.11a/b/g/n wireless LAN standard, 802.11 Legacy PSM, 802.11e Automatic Power Save Delivery (APSD), 802.11n Power Save Multi Poll (PSMP), Spatial Multiplexing (SM) Power Save modes have been used as the power save technique. The conventional art has the following five problems.

First, an awake mode station must be always in a reception-ready state. Second, a PSM, APSD or PSMP scheme requires a separate control signal and a large buffer size. Third, a MAC level power save technique requires a response delay time. Fourth, the IEEE 802.11n SM Power Save mode scheme is effective in the multi-antenna system, but the power consumption efficiency of single-path circuits is still low. Fifth, it is likely that the VHT mode will use an 80-MHz bandwidth. In this case, the sampling rate of the ADC and the DAC needs to be 160 MHz or more, which is four times higher than the existing IEEE. 802.11a/g. Sixth, since the power consumption is proportional to the operating frequency and the circuit size, it is necessary to minimize the operating frequency, the number of toggling, and the number of operating circuits. Regarding this, the conventional art reaches a limit.

The conventional power save technique has been carried out in a MAC layer. However, as described above, in order to extend a battery charge cycle of a portable station by improving the power consumption efficiency of a more complicated system, there is a need for a cross layer power save technique which supplements the problems of the power save technique of the MAC layer by using the physical layer technique.

Therefore, the power save technique which is the first part of the present invention will be described below. The cross layer power save mode (CL PS mode) will be referred to as a power save mode in the construction of the present invention which improves the power consumption efficiency by using both the power save mode techniques of the physical layer and the MAC layer.

1. Cross Layer Power Save Mode 1

In a reception-ready state of an awake period of a station, the station improves the dynamic power consumption efficiency by minimizing the operating frequencies of the ADC or the DAC and the modem processor. A legacy mode uses a bandwidth of 20 MHz, an HT mode can support a bandwidth of up to 40 MHz, and a VHT mode can support a bandwidth of up to 80 MHz. Since a request-to-send frame and a clear-to-send frame are transmitted in a legacy mode so that a legacy station can also receive them, the ADC and the DAC use the operating frequency at a sampling rate of 40 MHz upon transmission/reception of RTS/CTS. When a data frame is a VHT mode, a sampling rate of 160 MHz is used in order to support a bandwidth of up to 80 MHz. When a data frame is an HT mode, a sampling rate of 80 MHz is used to support a bandwidth of up to 40 MHz. When a data frame is a legacy mode, the operating frequency is transmitted at a sampling rate of 40 MHz. The power consumption efficiency can be improved by changing the sampling rate according to the data format.

In order to normally process a baseband signal in the digital modem even though the operating frequencies of the ADC and the DAC are changed, a procedure of controlling an RF band stop filter bandwidth and controlling the operating frequencies of an interpolator and a decimator. The embodiment of the present invention includes a method which controls a mode by a request frame and a response frame, for example, RTS and CTS, or a control packet such as an ACK frame, and a controlling apparatus therefore. That is, the use of the first cross layer power save mode can improve the dynamic power consumption efficiency by optimizing the operating frequencies of the ADC, the DAC, and the modem processor in the reception-ready state prior to the transmission/reception of the request/response packet.

Such a method will be described below in detail.

In a legacy/HT/VHT hybrid mode BSS, a control signal such as request/response frames is transmitted and received in a legacy mode format in order for compatibility. In this case, a station which is in a reception-ready state in an awake mode improves the power consumption efficiency by setting the sampling rate of the ADO to 40 MHz.

At this time, the RF center frequency and the analog band stop filter may be reconfigured. In addition, the band stop filter of the digital filter may be reconfigured. Furthermore, the operating frequency of a decimator included in a receiving unit is reconfigured.

A transmitting unit transmits RTS/CTS in such a state that the sampling rate of the DAC is lowered to a 40-MHz bandwidth. In addition, in the transmitting unit, the RF center frequency, the analog band stop filter, and the digital band stop filter may be reconfigured as in the receiving unit. In addition, the operating frequency of an interpolator included in the transmitting unit may be reconfigured.

The station which transmits and receives the request/response frames changes to a maximum supportable operating frequency in order to transmit and receive the data packet. The station which successfully receives ACK again changes to the power save mode when a transmission opportunity period is ended. In addition, the station which transmits ACK and confirms no retransmission again changes to the power save mode. The above-described cross layer power save mode 1 can be used together with the conventional art.

2. Cross Layer Power Save Mode 2

In the reception-ready state of the awake period, power is supplied to only a carrier sensing related block prior to a carrier sensing, and power of the other blocks is interrupted. In order for a power save mode operation of a wireless communication system using a multi-antenna technique, the conventional SM power save technique enables a few reception paths and disables the others prior to the transmission and reception of RTS and CTS packets. In this method, a few reception paths must be enabled so that they are in a reception-ready state. On the other hand, when the cross layer power save mode 2 in accordance with the embodiment of the present invention is used, the power is supplied to only the carrier sensing related block provided at a front stage of a modem unit and is interrupted to the other blocks prior to the carrier sensing, and the power is then supplied to the other blocks after the carrier sensing. Hence, the power consumption efficiency can be further improved. In addition, the conventional SM power save technique must use RTS and CTS. However, the cross layer power save mode 2 in accordance with the embodiment of the present invention need not use RTS and CTS.

The cross layer power save mode 2 in accordance with the embodiment of the present invention will be described below in more detail.

The cross layer power save mode 2 is a use invention of Korean Patent Application No. 10-2008-0127376 (U.S. patent application Ser. No. 12/561,076). The cross layer power save mode 2 of this patent application focuses on a physical layer power save technique, but the present invention is improved to a cross layer power save mode technique and interworks with the cross layer power save mode 1 to achieve the performance improvement, which will be described later in a cross layer power save mode 3.

Since the receiving end of the wireless communication system cannot predict when a signal will be inputted, it is always in a reception-ready state in an awake state. Thus, the dynamic power consumption efficiency of the receiving circuit is degraded. The embodiment of the present invention uses the conventional method of supplying the power to only the carrier sensing related block prior to the carrier sensing and supplying the power to the other blocks after the carrier sensing, and also uses a method of interrupting the power of the carrier sensing related block in a doze mode which is a MAC level power save mode. Hence, the power consumption efficiency can be further improved.

Figure 1B:
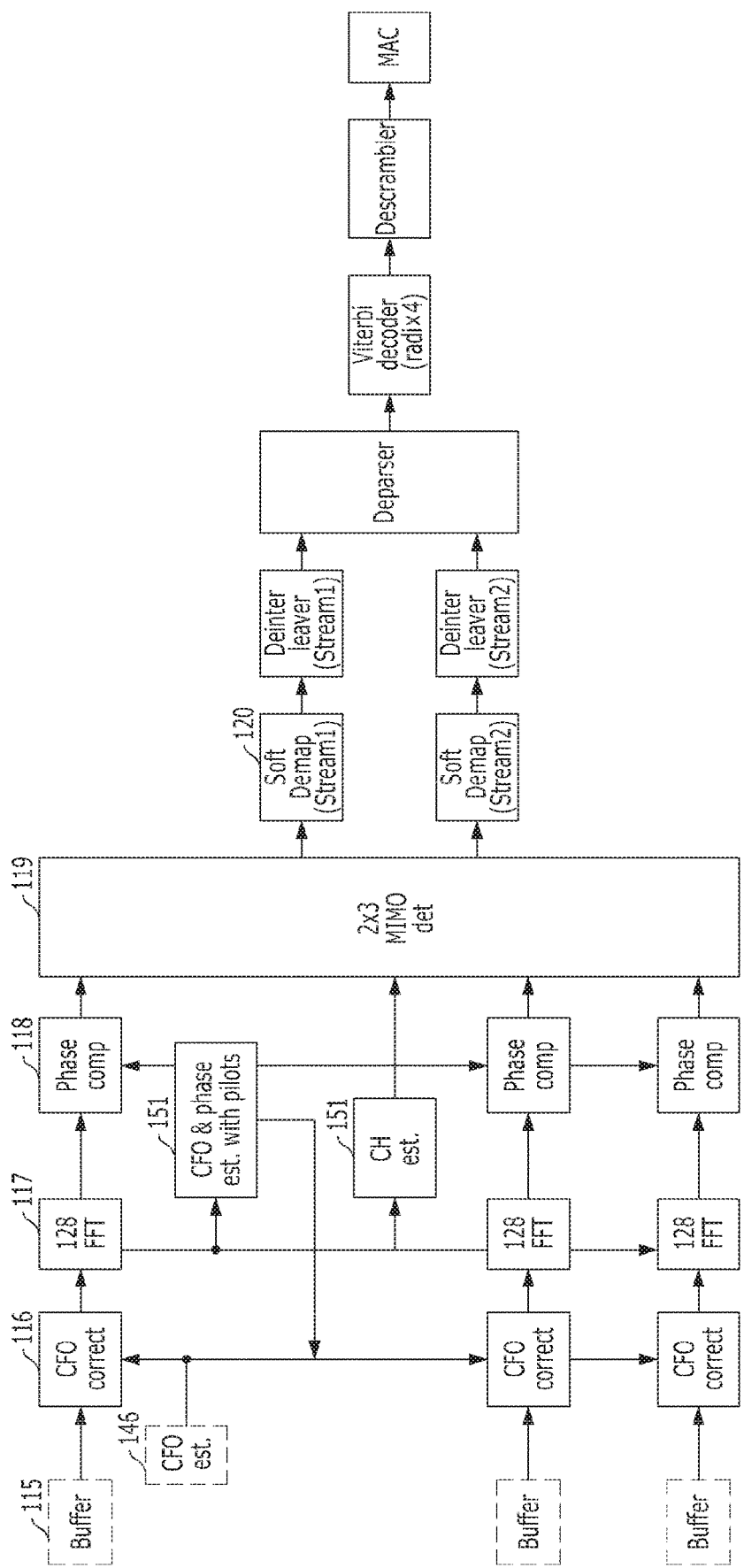

FIGS. 1A and 1B are block diagrams of a wireless communication station having three reception paths.

FIGS. 1A and 1B illustrate an example of a multi-antenna system. Reference numerals for the same parts processing signals received from the respective antennas are omitted. In addition, the parts to which reference numerals are not assigned perform the same operations as the parts to which reference numerals are representatively assigned, a duplicate description thereof will be omitted. Furthermore, FIGS. 1A and 1B are connected to form a single drawing. That is, the output signals of FIG. 1A are inputted to FIG. 1B, and such an input/output relation is illustrated therein.

In an RF block 100 which processes RF signals received from the antennas, only a low noise amplifier (LNA) 101 and a voltage-controlled gain amplifier (VGA) 102 are illustrated. The LNA 101 amplifies the signals received from the antennas while suppressing noise, and VGA 102 performs an amplification operation thereon. The RF block 100 converts an RF frequency band signal into a desired band signal, and converts an analog signal into a digital signal through an ADC 111. The digital signal is inputted to a DC canceller 112, an energy detector 121, an automatic gain controller (AGC) 131, and a saturation based carrier sensor 132. The DC canceller 112 cancels a DC component from the digital signal. The signal from which the DC component is cancelled is inputted to an FQ channel signal comparator 113. The output signal of the I/Q channel signal comparator 113 is inputted to a buffer 115 and a channel mixer 141. The signal inputted to the buffer 115 is read in units of a specific period and is inputted to a carrier frequency offset (CFO) estimator 116. The CFO corrector 116 detects and controls a carrier frequency offset.

An output signal of the CFO corrector 116 is fast-Fourier-transform (FFT) processed by an FFT processor 117. That is, a time-domain signal is transformed into a frequency-domain signal. The frequency-domain signal is phase-compared by a phase comparator 118 and is detected as a signal based on each antenna, each band, or each stream by a MIMO detector 119. The signal detected by the MIMO detector 119 is inputted to a demapper 120. The demapper 120 demaps the signal based on each antenna, each band, or each stream.

The energy detector 121 receiving the digital signal outputted from the ADC 111 detects energy of the digital signal, and outputs it to a clear channel assessment (CCA) 122. The CCA 122 detects whether a signal exists on a channel and notifies the detection result to a MAC layer. The saturation based carrier sensor 132 receiving the digital signal from the ADC 111 determines saturation or non-saturation by detecting the carrier signal, and provides signal level information to the AGC 131. The AGO 131 uses the received digital signal to control gains of the LNA 101 and the VGA 102, based on the signal level information received from the saturation based carrier sensor 132.

Meanwhile, the channel mixer 141 receiving the output signals of the I/Q channel comparators 113 mixes the received signals. An LPF/averaging unit 142 low-pass-filters the received signal and calculates an average by dividing a decimal value by 2. An output signal of the LPF/averaging unit 142 is inputted to a receive signal strength indicator (RSSI) sensor 123, an RSSI based carrier sensor 143, an auto correlator 144, and a cross correlator 145. The RSSI sensor 123 measures an RSSI of a received signal and provides the measured RSSI to the CCA 122. When a carrier signal is detected, the RSSI based carrier sensor 143 measures an RSSI of the detected carrier signal. The auto correlator 144 and the cross correlator 145 calculate correlation values. A CFO estimator 146 estimates a CFO and provides the estimation result to a frame synchronizer 147. The frame synchronizer 147 receives signals from the RSSI based carrier sensor 143, the cross correlator 145, the saturation based carrier sensor 132, and the CFO estimator 146, and detects a frame synchronization. In addition, the CFO estimator 146 provides the estimated value to a CRO corrector 117 provided at each antenna. An XCR based carrier sensor 148 calculates an XCR.

In addition, the FFT processor 117 provides the FFT-processed information to a CFO/phase estimator 151 and estimates a CFO and a phase. The estimated phase information is provided to the phase comparator 118. In addition, the FFT processor 117 receives information from the channel estimator 152 and performs channel estimation. Using the channel estimation information performed at the channel estimator 152, the MIMO detector 119 outputs the signal based on each stream.

Soft demappers perform a demapping based on each stream, and a deinterleaver deinterleaves the output of the corresponding demapper. A deparser inserts necessary information into the deinterleaved information, and a decoder decodes the resulting signal. Then, a descrambler descrambles the signal and transfers the descrambled signal to the MAC layer.

In the above-described architecture of FIGS. 1A and 1B, a power source and a power source controller are not illustrated. The operations of the power source and the power source controller will be described later. In addition, a block 150 indicated by dotted lines of FIG. 1A is related to a carrier sensing. Power is supplied to only the block 150 in an awake mode. When the carrier is sensed, power is supplied to the other blocks. Furthermore, in FIGS. 1A and 1B, the parts other than the MAC layer correspond to a physical layer part.

A difference from the conventional art is as follows.

1) A 4-stage cross layer power save mode wireless communication system has four states: a doze state, a state prior to RTS/CTS reception of an awake mode, a state after an RTS/CTS reception of an awake mode before data reception, and a data receiving state. In accordance with the embodiment of the present invention, the power save mode is optimized according to the four reception states. That is, in the doze mode, all blocks except for a MAC timer are turned off. In the awake mode, only the carrier sensing blocks of a few paths (one or more than two) are turned on. After the RTS/CTS reception, the other blocks of a few paths are turned on. Upon the data reception, all blocks of all paths are turned on.

2) The embodiment of the present invention relates to a cross layer power save technique using both a power save technique of a physical layer and a power save technique of a MAC layer, which can improve the power consumption efficiency, as compared to the conventional single-layer power save technique.

Figure 2:
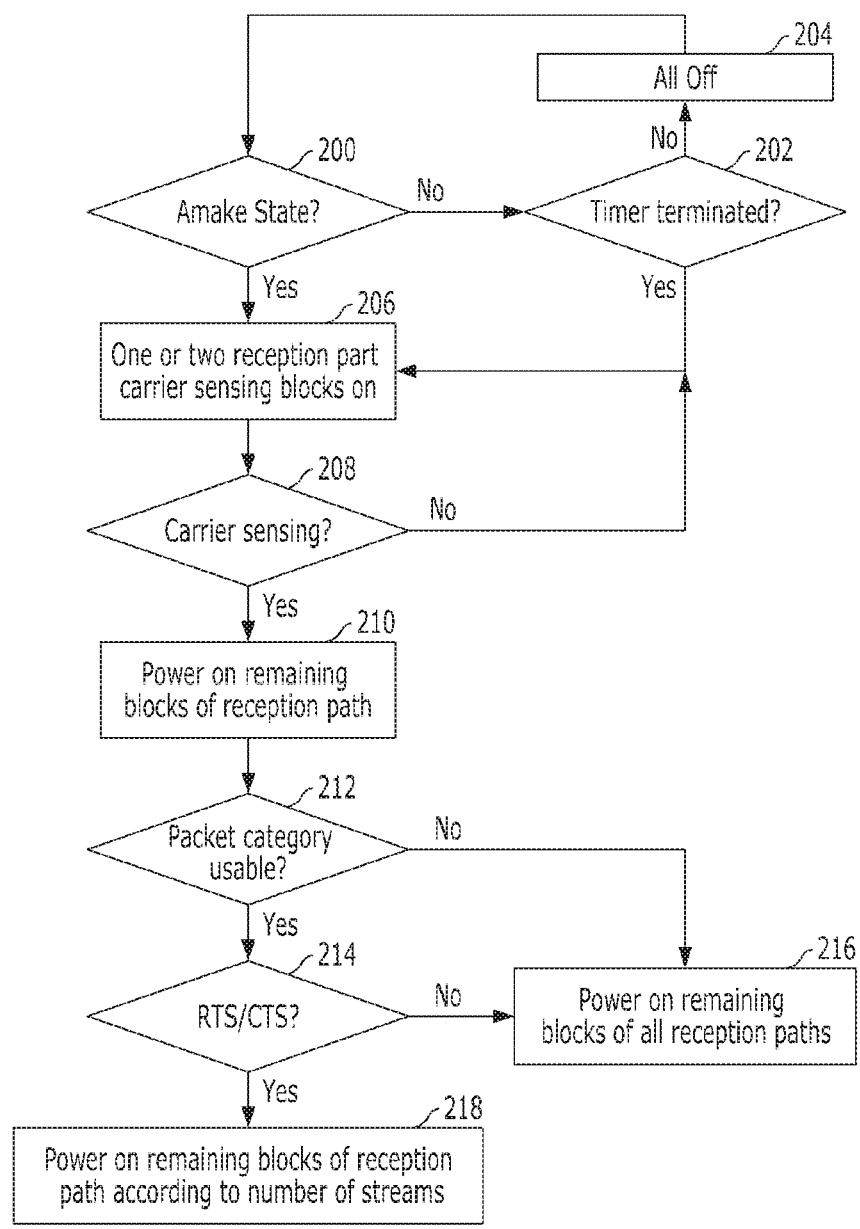
FIG. 2 is a flowchart in a power save mode change in accordance with an embodiment of the present invention.

FIG. 2 is a flowchart in a power save mode change in accordance with an embodiment of the present invention.

At step 200, a wireless LAN device determines whether or not it is in an awake state. If so, the wireless LAN device proceeds to step 206; otherwise, the wireless LAN device proceeds to step 202. At step 202, the wireless LAN device determines whether or not a timer is terminated. If so, the wireless LAN device proceeds to step 206; otherwise, the wireless LAN device proceeds to step 204 to turn off power of all blocks and returns to step 200.

When the wireless LAN device is at step 200 or when the wireless LAN device proceeds from step 202 to step 206, power is supplied to only one or two reception part carrier sensing blocks. When the wireless LAN device is awake due to the termination of the timer or it is in the awake mode, it is prior to the carrier sensing. Thus, it is in the above-described second reception state, that is, the state prior to the RTS/CTS reception.

After the power is supplied to only the carrier sensing blocks, the wireless LAN device proceeds to step 208 to determine whether the carrier sensing is performed within a predetermined time. When the carrier sensing is performed, the wireless LAN device proceeds to step 210; otherwise, the wireless LAN device proceeds to step 206.

When the carrier sensing is performed, the wireless LAN device proceeds to step 210 to supply power to the remaining blocks of the reception path. Then, the wireless LAN device proceeds to step 212 to determine whether or not a packet category can be used. That is, the wireless LAN device determines whether or not the packet kind information can be used. When it is determined that the packet category, such as RTS/CTS, can be used, the wireless LAN device proceeds to step 214; otherwise, the wireless LAN device proceeds to step 216.

At step 214, the wireless LAN device determines or not whether the received packet category is the RTS/CTS packet. When it is determined that the received packet category is the RTS/CTS packet, the wireless LAN device proceeds to step 218 to supply the power to the corresponding blocks of the reception path according to the number of streams.

On the other hand, when it is determined at step 214 that the received packet category is not the RTS/CTS packet, or it is determined at step 212 that the packet category cannot be used, the wireless LAN device proceeds to step 216 to supply the power to the blocks of all reception paths.

In summary, in the doze mode, the power supplied to all blocks is interrupted until the timer is terminated. When the timer is terminated, the power is supplied to only the path necessary for the carrier sensing and the corresponding carrier sensing blocks. When the carrier sensing is performed in the awake mode, the power is supplied to the other blocks of the corresponding path for the carrier sensing. When the packet kind information can be used and the received packet is the RTS/CTS, more paths can be turned on in order to improve the carrier sensing result of the data packet. When the packet kind information cannot be used or the received packet is the data packet, all paths are turned on.

Figure 3:
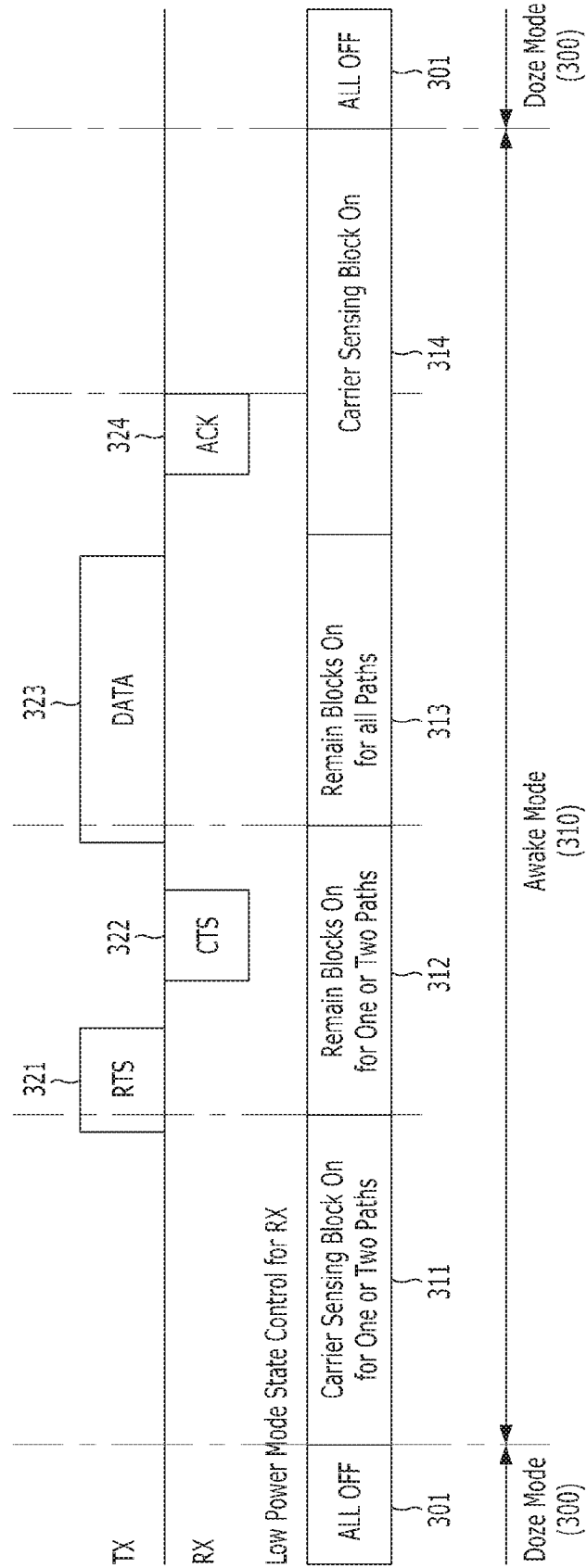
FIG. 3 is a timing diagram for helping the understanding of the operation principle of four reception modes in accordance with an embodiment of the present invention.

FIG. 3 is a timing diagram for helping the understanding of the operation principle of the four reception modes in accordance with an embodiment of the present invention.

In the doze mode 300, all blocks of the receiver are in the turned-off state 310. The awake mode 310 is divided into three cases. The first state 311 is a state in which the power is supplied to only the carrier sensing blocks corresponding to one or two reception paths for the carrier sensing. In the state 312, the received packet category or the packet reception is detected and the power is supplied to the blocks corresponding to one or two reception paths. That is, when the RTS (321) frame is received, the power is supplied to only the blocks for receiving the RTS frame. In the state 313, when the data frame 323 is received, the power is again supplied to all blocks corresponding to the reception path. After all data frames are received, the state changes to the state 314 in which the power is supplied to only the blocks for carrier sensing. In this state, the frames such as the ACK frame 324 can be received. When the ACK frame is received and then no signal is detected for a predetermined time, that is, until the preset timer is terminated, the wireless LAN device again enters the doze mode 300 to turn off all blocks.

That is, as described above with reference to FIG. 3, the corresponding station can operate in the doze mode or the awake mode in such a situation that RTS, CTS, data, and ACK frame are sequentially transmitted and received. In the awake mode, it can be determined whether or not to supply the power and clock to the internal reception blocks according to the carrier sensing and the kind of the frame in the awake mode.

Figure 4:
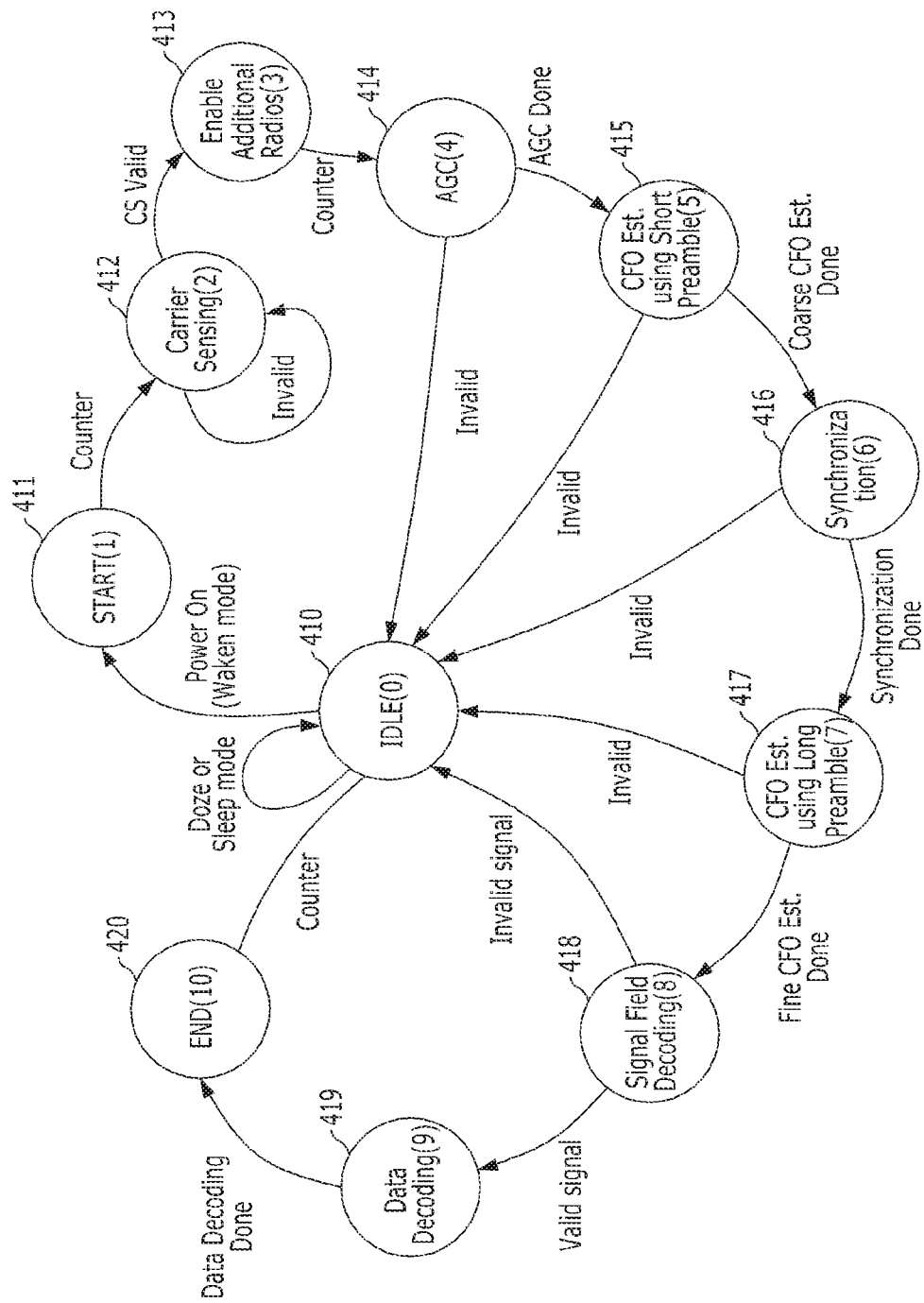
FIG. 4 is a finite state machine of a cross layer power save mode 2.

FIG. 4 is a finite state machine of a cross layer power save mode 2.

In FIG. 4, an idle state 410 refers to one or all states among an initial state and/or a standby state and/or a power off state. When the power is on in the idle state 410, a start state 411 begins. When a carrier is sensed in a carrier sensing (CS) state 412, it enters an enable additional radios state 413. Then, it changes to an AGC state 414 which controls a gain of a received signal by a counter value. In the AGC state 414, the gain of the received signal is controlled. When the gain of the received signal is controlled, it changes to a CFO estimation state 415 by using a short preamble. When the CFO estimation is roughly completed, it changes to a synchronization state 416 for synchronization of the signal provided from the system, that is, the frame. When the synchronization is acquired, it changes to a CFO estimation state 417 by using a long preamble. That is, the CFO is compensated and the temporary synchronization is acquired in the CFO estimation state 415 and the synchronization state 416.

When the CFO estimation is well completed using the long preamble, it changes to a signal field decoding state 418. In the signal field decoding state 418, the signal decoding is performed. When the signal decoding is validly completed, it changes to a data decoding state 419. When the data decoding is completed, it changes to an end state 420 and again changes to the idle state 410.

When the carrier is not detected in the CS sensing state 412, the carrier sensing state is continuously maintained. When the automatic gain control is failed in the AGC state 414, it changes to the idle state 210. As other cases of changing to the idle state, the following cases exist. The first case is a case in which the rough CFO estimation is impossible in the CFO estimation state 417 using the long preamble. The second case is a case in which the synchronization is impossible in the synchronization state 416. The third case is a case in which the exact CFO estimation is impossible in the CFO estimation state 417 using the long preamble. The fourth case is a case in which the signal field decoding is failed in the signal field decoding state 418.

In the finite state machine of FIG. 2, while it maintains the CS state, the power consumption is minimized by using a method of interrupting the supply of power and clock to the sub blocks corresponding to all subsequent states. By using such a state change, both the carrier sensing method and non-carrier sensing method can be applied.

Meanwhile, the idle state 410 is continuously maintained even in the doze mode or the sleep mode. In the doze mode, the carrier sensing blocks are turned off and are in the idle state. Then, when the timer of the MAC layer is terminated and it changes to the awake mode, it goes through the start state 411 and waits until the carrier is sensed in the carrier sensing state 412. At this time, only the carrier sensing block among the receiving ends of the station is turned on. Thus, the power consumption efficiency can be improved. After the carrier sensing, all blocks of the corresponding paths are turned on to process the signals.

Figure 5:
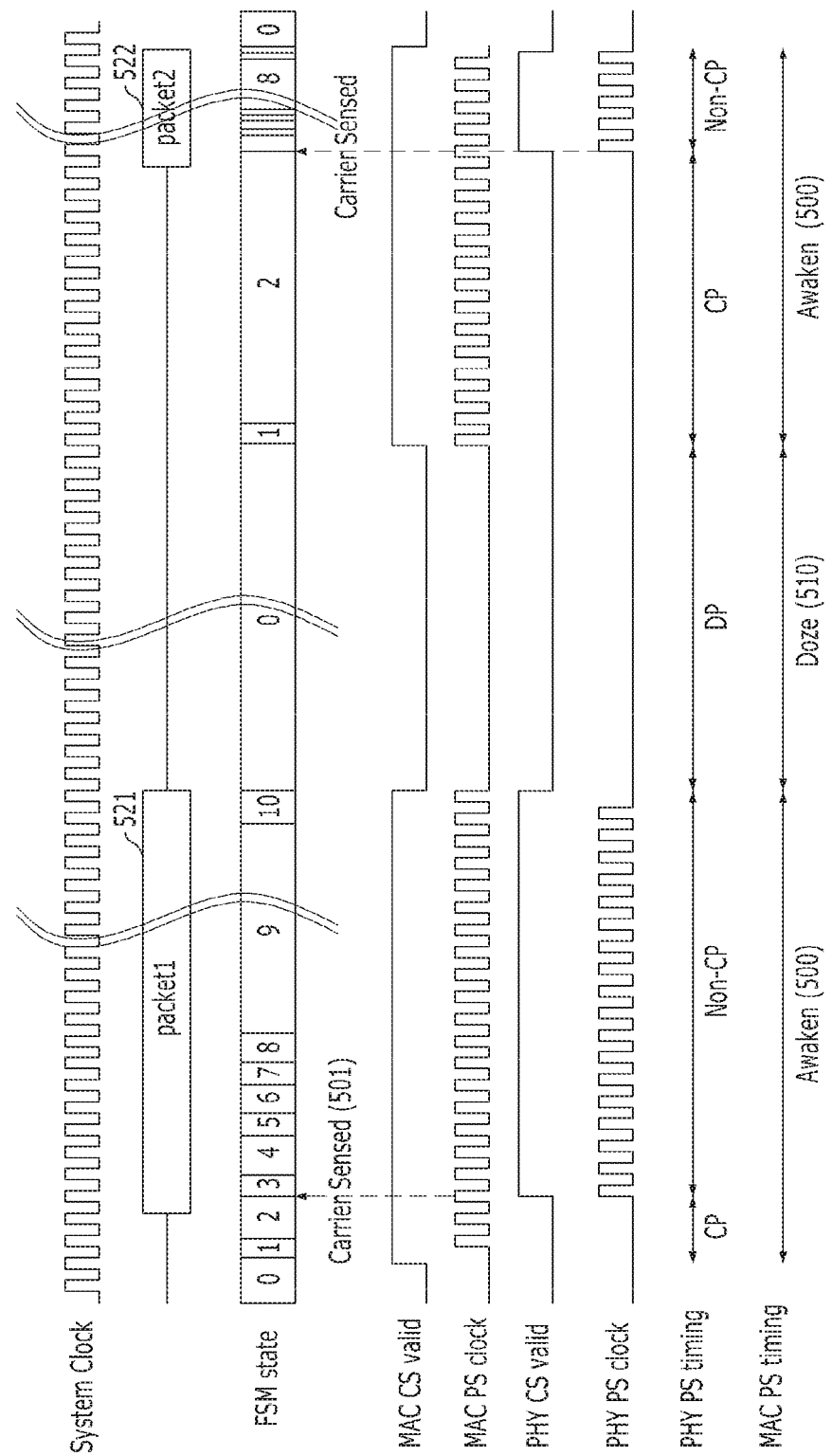
FIG. 5 is a timing diagram for helping the understanding of a power control step in accordance with an embodiment of the present invention.

FIG. 5 is a timing diagram for helping the understanding of a power control step in accordance with an embodiment of the present invention.

As illustrated in FIG. 5, the receiver in accordance with the embodiment of the present invention coexists in the awaken mode 500 and the doze mode 510. In the awaken mode 500, it is divided into a carrier sensing period CP and a carrier non-sensing period Non-CP in a physical layer power saving timing (PHY PS timing) The carrier sensing period CP is ended at the time point 501 when the carrier is sensed, and the packet 1 521 after the carrier sensing is being sensed during the carrier non-sensing period Non-CP. In the doze mode, the power of all blocks is interrupted. This is called the doze period DP.

As such, in the physical layer, no clock is provided to the physical layer blocks, to which the power is not supplied, in order to reduce the power consumption in the carrier sensing period CP. This can be confirmed by the physical layer power saving clock (PHY PS clock) and the physical layer carrier sensing valid information (PHY CS valid) illustrated in FIG. 5.

Meanwhile, in the MAC layer, the power saving clock (MAC PS clock) is supplied only from the carrier sensing period (CP) necessary for the carrier sensing. To detecting the carrier sensing, it can be confirmed from the MAC carrier sensing valid (MAC CS valid) information. These periods are maintained up to the time point when the doze mode begins.

As described above, the power save modes of the MAC layer and the physical layer are interworked to ensure the efficient power consumption efficiency, as compared to the case in which the MAC layer or the physical mode alone is used.

3. Cross Layer Power Save Mode 3

The cross layer power save mode 3 in accordance with the embodiment of the present invention is a hybrid mode of the cross layer power save mode 1 and the cross layer power save mode 2. In the cross layer mode 1, the cross layer mode 1 is controlled by the carrier sensing result of the cross layer mode 2, without any aid of the request/response frame and the ACK frame. Hence, as compared to the cross layer mode 1, the power consumption efficiency can be improved by reducing the dynamic power consumption for an interframe space (IFS) time (16 us) and the carrier sensing time (about 2 us) due to the cross layer mode 2. The cross layer power save mode 3 can change a power save mode by the carrier sensing result, without RTS/CTS, unlike in a case in which the RTS/CTS is used in the cross layer power save mode 1.

According to the cross layer power save mode 1 described above, the RF unit converts the signal passing through the 20-MHz band stop filter into a digital signal at a sampling rate of 40 MHz and the carrier is sensed.

In addition, after the carrier is sensed by the cross layer power save mode 2, the blocks other than the carrier sensing are operated.

When the packet is received in such a manner, the receiver of the wireless LAN system is operated using the maximum sampling rate.

At this time, when the kind of the data packet to be received can be previously known by the request/response packet, the sampling rate can be determined according to the mode of the received packet, not the maximum sampling rate.

In addition, during the above procedure, a process of changing the operating frequency of the interpolator and the decimator and reconfiguring the RF analog band stop filter and the digital band stop filter is included.

In the method in accordance with the third embodiment of the present invention, the sampling rate of the modem unit for processing a baseband signal can be optimized to the corresponding mode.

The configuration and operation of the cross layer power save mode has been described above. A transmitting method for improving the efficiency of the cross layer power save mode described above will be described as the second part of the present invention.

The information of the frame to be received by the receiving end is included in the request frame or the response frame and then is transmitted. Thus, the receiving end can be waited in a state optimized to the corresponding bandwidth. That is, next transmission mode information of the data frame to be transmitted after the request/response frame, for example, RTS/CTS frames, is informed together. Thus, the reception mode, such as the analog/digital filter setting, the RF center frequency setting, or the operating frequency sampling rate, is optimized to the kind of the frame to be received, thereby improving the throughput and improving the power consumption efficiency.

1) In this case, the required performance index value and transmission stream number are as follows.

When the stream number of the transmit signal is smaller than the number of the receive antennas, all multi-antennas are not necessarily used and the number of antennas to be used can be selected according to the required performance index value. The required performance index may include a contents category or a link performance value, for example, a signal to noise ratio or a channel variation.

2) The transmission packet mode, the channel bandwidth to be used, and the transmission transmitting method are as follows.

After receiving the request/response packet, the optimized operating frequency for the corresponding packet mode can be used, without changing to the maximum operating frequency which can be supported by the receiver.

In addition, since the optimal filter for the received signal can be applied, the detection reliability of the receiving end can be improved.

In addition, a green field mode operation can be performed during the transmission opportunity period.

Consequently, the throughput and the power consumption efficiency can be improved.

A method for previously notifying information for transmission will be described below. It is assumed that a first node and a second node communicate with each other. The first node or the second node can determine whether a correspondent node includes the channel state information or the data frame mode information, based on the dynamic channel bandwidth allocation supportable bit of the request frame or the response frame, for example, 1 bit value.

The transmission mode information of the request/response frame may be included in the request/response frame and transmitted as in the following embodiment. However, it should be noted that the invention is not limited to the following embodiment, and the invention can be realized while maintaining the conventional standard and compatibility by using a reservation bit remaining the request/response frame.

1) A service field of a physical layer
2) A duration field of a MAC header 3) a frame control field of the MAC header For example, four bandwidth support modes can be set using two bits in the service field or the duration field. The four bandwidth support modes may be divided as follows.

00: 20 MHz,
01: 40 MHz,
10: 80 MHz,
11: 160 MHz

The information of the next frame which is included in the request/response frame may be used in order for noise reduction and multi-mode frame coexistence (20/40/80/160 MHz bandwidth or the legacy/HT/VHT mode), not for the power save mode.

Figure 7:
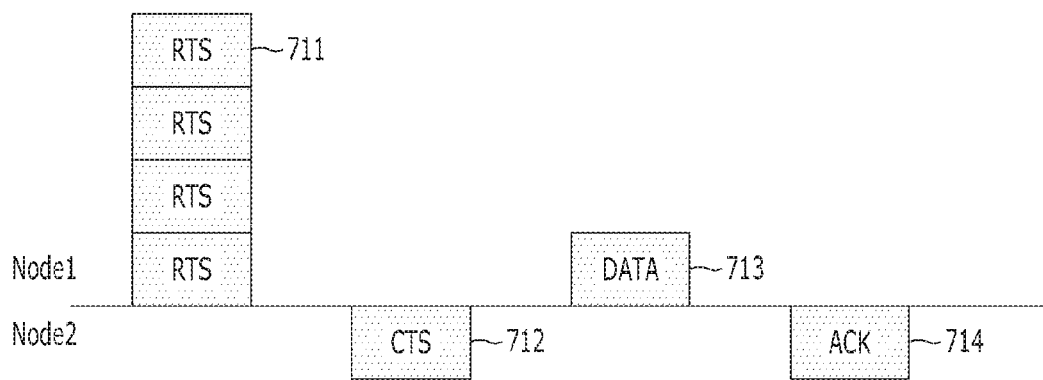
FIGS. 7 and 8 are timing diagrams for noise reduction and a multi-mode frame coexistence in accordance with an embodiment of the present invention.
Figure 8:
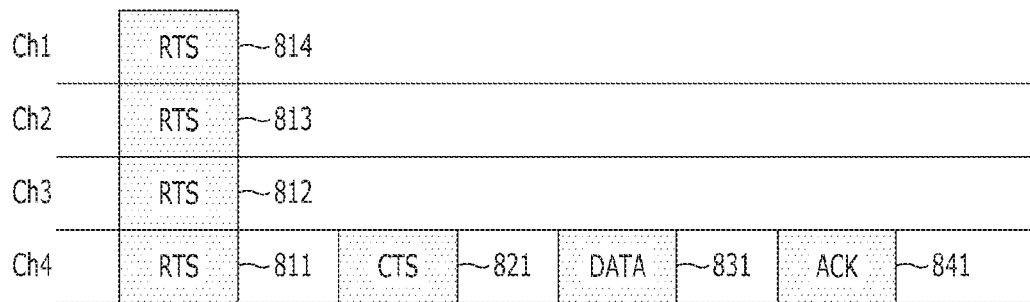

FIGS. 7 and 8 are timing diagrams for noise reduction and a multi-mode frame coexistence in accordance with an embodiment of the present invention.

First, referring to FIG. 7, a frame 711 in which four 20-MHz bandwidth RTSs are bonded is transmitted to an entire 80-MHz band before data frame transmission in order to transmit a 20-MHz bandwidth data frame to the node 1 and the node 2. In this way, the node 1 is in a standby state by setting network allocation vector (NAV) values of various nodes supporting adjacent 20/40/80 MHz bandwidths, not its own frame. On the other hand, the node 2 recognized as its own frame changes the center frequency and a filter of a receiving end, based on the bandwidth value set in the frame 711 in which the four RTSs are bonded, and transmits a CTS frame 712 over a 20-MHz band. The node 1 receiving the CTS frame 712 transmits a 20-MHz bandwidth data frame 713. The node 2 reconfigured to be suitable for the reception of the data frame 713 receives the data frame 713 and then transmits an ACK frame 714 when the received data frame is correctly recovered.

FIG. 8 illustrates the above-described embodiment of FIG. 7 which is divided based on a channel bandwidth. That is, RTS frames 811, 812, 813 and 814 are transmitted over the 80-MHz bandwidth. By using the bandwidth information values set to the RTS frames 811, 812, 813 and 814), noise and power consumption can be reduced when transmitting or receiving the CTS frame 821, the data frame 831, and the ACK frame 841m which are the 20-MHz bandwidth mode.

Figure 9:
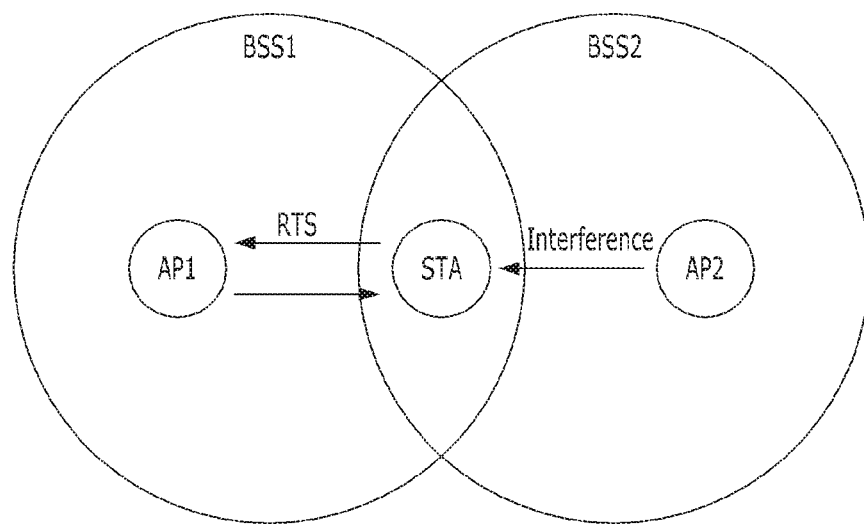
FIG. 9 is a diagram for explaining the operation of the present invention in an overlapped basic service set (OBSS) situation.

FIG. 9 is a diagram for explaining the operation of the present invention in an overlapped basic service set (OBSS) situation. In a BSS1, when an AP1 transmits the RTS frame in order to transmit data to a station STA, four 20-MHz band RTSs are simultaneously transmitted on the assumption that it is known that a station supporting a band of up to 80 MHz is included. At this time, when a BSS2 transmits a 40-MHz band signal, the AP1 does not know whether an interference signal exists.

At this time, the station transmits the CTS through the 40-MHz band except for the band influenced by the interference signal, and the AP1 transmits the data frame through the 40-MHz band through which the CTS is received. At this time, the station must be able to discriminate the interference signal and a signal to be received. Since APs have their inherent BSS identification (BSSID), it can be determined whether the received packet is a packet outputted from the BSS where the station is included, or a packet outputted from an external BSS, based on the BSSID included in the MAC header. The interference signal is discriminated and CTS is transmitted over a band in which an interference signal area is excluded from a band confirmed by RTS. The AP1 can transmit data over a band at which CTS is received. In addition, the occupied bandwidth can be minimized through the above procedure. The frequency resources can be efficiently used and the power consumption efficiency can be improved.

Finally, the embodiment of the present invention includes a power save mode of a multi-channel transmitting method which is to be used as a next generation wireless LAN technique. The next generation wireless LAN technique transmits data using an 80-MHz bandwidth, which is four times or two times wider than the existing 20-MHz or 40-MHz bandwidth. Thus, the throughput can be increased two times to four times. However, as the sampling rates of the ADC and the DAC are increased, the power consumption is also increased. In addition, since the modem processor uses a high operating frequency, the dynamic power consumption efficiency is degraded. However, the station need not always use a high sampling frequency, and the power consumption efficiency can be improved using an appropriate sampling rate according to the mode and the kind of the packet used.

The power save mode for the conventional spatial multiplexing scheme improves the power consumption efficiency by turning on a few reception paths and turning off the others prior to the reception of RTS/CTS. However, the power save mode for the multi-channel scheme in accordance with the embodiment of the present invention uses a sampling rate at which a legacy mode packet can be received prior to the reception of RTS/CTS, and controls the sampling rate according to the corresponding mode packet or the used mode after the reception of RTS/CTS. A controlling apparatus can change to a corresponding mode when a kind of a next data packet or mode information to be used can be transmitted over the RTS/CTS packet, and, if not, controls to a maximum sampling rate for a mode which is supported by the corresponding station.

The embodiment of the present invention can support both the continuous channel transmission scheme and the discontinuous multi-channel transmission scheme. That is, when the multi-channel is continuous, it operates with the increase/decrease of a sampling rate. However, when the multi-channel is discontinuous, the power consumption efficiency can be improved by determining whether to use a discontinuous path.

Figure 6:
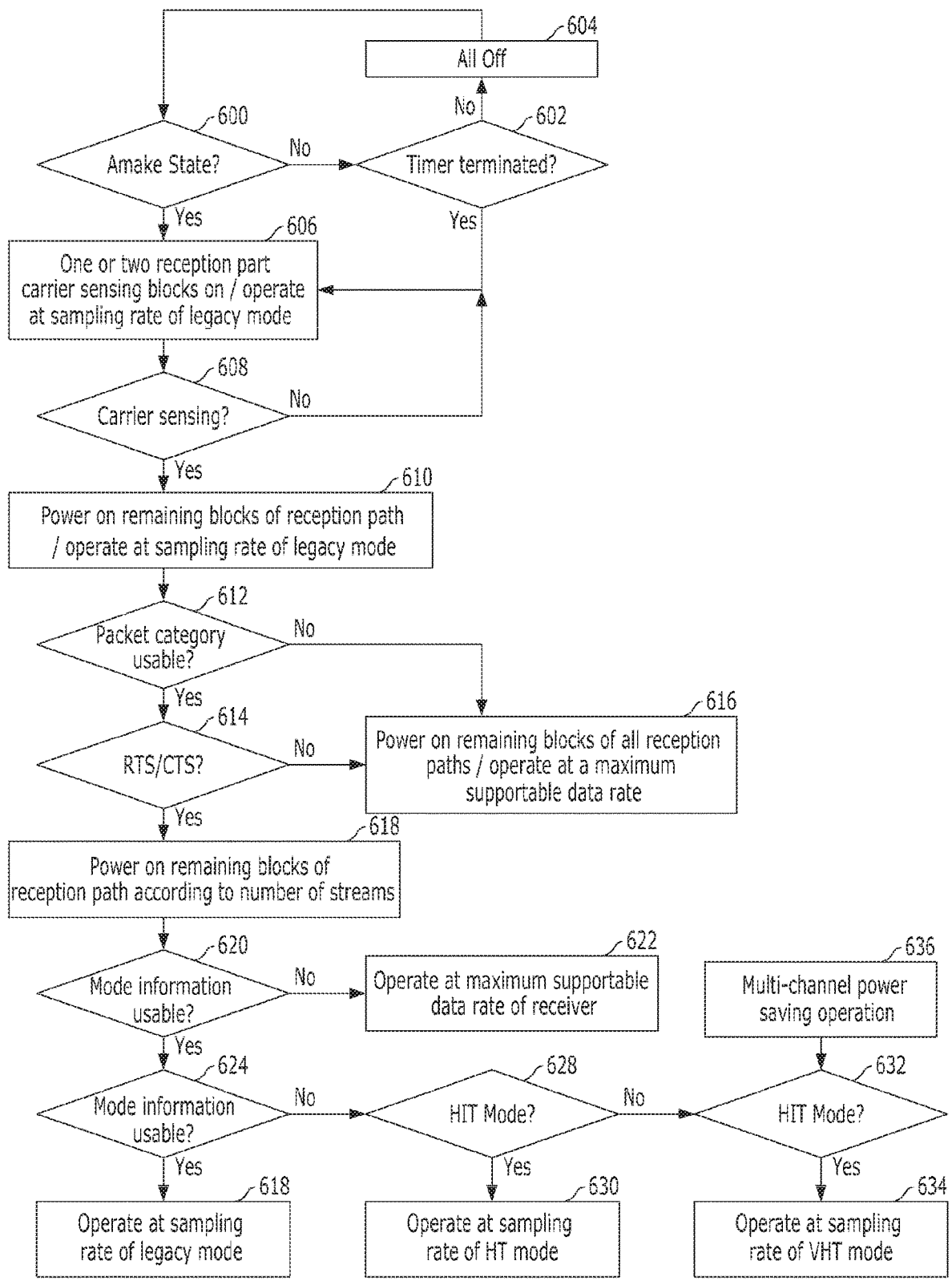
FIG. 6 is a flowchart of a change procedure in a multi-channel power save mode in accordance with an embodiment of the present invention.

FIG. 6 is a flowchart of a change procedure in a multi-channel power save mode in accordance with an embodiment of the present invention.

At step 600, a wireless LAN receiver determines whether or not it is in an awake state. If so, the wireless LAN receiver proceeds to step 606; otherwise, the wireless LAN receiver proceeds to step 602. At step 602, the wireless LAN receiver determines whether or not a timer is terminated. If so, the wireless LAN receiver proceeds to step 606; otherwise, the wireless LAN receiver proceeds to step 604 to turn off power of all blocks and returns to step 600.

When the wireless LAN receiver is at step 600 or when the wireless LAN receiver proceeds from step 602 to step 606, power is supplied to only one or two reception part carrier sensing blocks. At this time, the wireless LAN receiver operates at a sampling rate of a legacy mode. When the wireless LAN receiver is awake due to the termination of the timer or it is in the awake mode, it is prior to the carrier sensing. Thus, it is in the above-described second reception state, that is, the state prior to the RTS/CTS reception.

After the power is supplied to only the carrier sensing blocks, the wireless LAN receiver proceeds to step 608 to determine whether the carrier sensing is performed within a predetermined time. When the carrier sensing is performed, the wireless LAN receiver proceeds to step 610; otherwise, the wireless LAN receiver proceeds to step 606.

When the carrier sensing is performed, the wireless LAN receiver proceeds to step 610 to supply power to the remaining blocks of the reception path. At this time, the sampling rate may use a sampling rate of the legacy mode. In this way, the sampling rate is reduced and therefore the power consumption is reduced. Then, the wireless LAN receiver proceeds to step 612 to determine whether or not a packet category can be used. That is, the wireless LAN receiver determines whether or not the packet kind information can be used. When it is determined that the packet category, such as RTS/CTS, can be used, the wireless LAN receiver proceeds to step 614; otherwise, the wireless LAN receiver proceeds to step 616.

At step 614, the wireless LAN receiver determines or not whether the received packet category is the RTS/CTS packet. When it is determined that the received packet category is the RTS/CTS packet, the wireless LAN receiver proceeds to step 618 to supply the power to the corresponding blocks of the reception path according to the number of streams.

On the other hand, when it is determined at step 614 that the received packet category is not the RTS/CTS packet, or it is determined at step 612 that the packet category cannot be used, the wireless LAN receiver proceeds to step 616 to supply the power to the blocks of all reception paths.

Then, the wireless LAN receiver proceeds to step 620 to determine whether or not mode information can be used. The mode information is transmitted in the above-described manner. When the mode information cannot be used, the wireless LAN receiver proceeds to step 622 to operate at a maximum data rate which can be supported by the receiver.

On the other hand, when the mode information can be used, the wireless LAN receiver proceeds to step 624 to determine whether or not the current mode is the legacy mode. When it is determined at step 624 that the current mode is the legacy mode, the wireless LAN receiver proceeds to step 626 to operate at a sampling rate of the legacy mode. When it is determined at step 624 that the current mode is not the legacy mode, the wireless LAN receiver proceeds to step 628 to determine whether or not the current mode is the HT mode. When it is determined that the current mode is the HT mode, the wireless LAN receiver proceeds to step 630 to operate at a sampling rate corresponding to the HT mode.

However, when it is determined at steps 624 and 628 that the current mode is neither the legacy mode nor the HT mode, the current mode is the VHT mode. Therefore, the wireless LAN receiver proceeds to step 632 to determine whether or not the data stream is contiguously received. When it is determined that the data stream is contiguously received, the wireless LAN receiver proceeds to step 634 to operate at the sampling rate of the VHT mode. However, when it is determined that the data stream is not contiguously received, the wireless LAN receiver proceeds to step 636 to perform a multi-channel power saving operation.

FIG. 6 illustrates the change order of the power save mode according to the above-described four reception states. That is, in the doze mode, all blocks are turned off until the timer is terminated. When the timer is terminated, the power is supplied to only the path necessary for the carrier sensing and the corresponding carrier sensing blocks. At this time, since the RTS/CTS is transmitted in the legacy mode, the operating frequency for the legacy mode is set. When the carrier sensing is performed in the awake mode, the power is supplied to the other blocks of the corresponding path for the carrier sensing. When the packet kind information can be used and the received packet is the RTS/CTS, more paths can be turned on in order to improve the carrier sensing result of the data packet. When the packet kind information cannot be used or the received packet is the data packet, all paths are turned on. At this time, the corresponding station changes to a maximum supportable operating frequency so that it can process any kind of a packet. In a case in which the packet kind information can be used and thus the packet is the RTS/CTS packet, it changes to a sampling rate suitable for the corresponding mode when the mode information can be used. When the mode information cannot be used, the corresponding station changes to the maximum supportable sampling rate so that it can process a packet of any mode. When the mode is the packet of the UHT mode, the power and clock may not be supplied to the paths for the discontinuous channel which is used as the above-described power save mode for the multi-channel transmission.

INDUSTRIAL APPLICABILITY

The present invention can be used in a wireless LAN system and the like.

The invention claimed is:

1. A communication method for receiving user data, the method comprising:
   receiving, from a first station, a request to send (RTS) frame on each of a set of channels;
   selecting one or more channels from the set of channels;
   transmitting, to the first station, a clear to send (CTS) frame on each of the selected one or more channels; and
   receiving, from the first station, a first frame comprising the user data using only the selected one or more channels among the set of channels,
   wherein the RTS frame comprises bandwidth information which indicates a combined bandwidth of the set of channels.

2. The communication method of claim 1, wherein each of the set of channels is a 20 MHz band.

3. The communication method of claim 1, wherein the bandwidth information comprises two bits which indicate a bandwidth selected from a group of 20 MHz, 40 MHz, 80 MHz and 160 MHz.

4. The communication method of claim 1, wherein the RTS frame comprises information indicating that the first station supports a dynamic bandwidth operation.

5. The communication method of claim 1, wherein the CTS frame comprises bandwidth information which indicates a combined bandwidth of the selected one or more channels and information indicating that a second station transmitting the CTS frame is capable of selecting the one or more channels from the set of channels.

6. An apparatus for receiving user data, the apparatus comprising:
   a circuitry,
   wherein the circuitry is configured to:
   cause the apparatus to receive, from a first station, a request to send (RTS) frame on each of a set of channels;
   select one or more channels from the set of channels;
   cause the apparatus to transmit, to the first station, a clear to send (CTS) frame on each of the selected one or more channels; and
   cause the apparatus to receive, from the first station, a first frame comprising the user data using only the selected one or more channels among the set of channels, wherein the RTS frame comprises bandwidth information which indicates a combined bandwidth of the set of channels.

7. The apparatus of claim 6, wherein each of the set of channels is a 20 MHz band.

8. The apparatus of claim 6, wherein the bandwidth information comprises two bits which indicate a bandwidth selected from a group of 20 MHz, 40 MHz, 80 MHz and 160 MHz.

9. The apparatus of claim 6, wherein the RTS frame comprises information indicating that the first station supports a dynamic bandwidth operation.

10. The apparatus of claim 6, wherein the CTS frame comprises bandwidth information which indicates a combined bandwidth of the selected one or more channels and information indicating that a second station transmitting the CTS frame is capable of selecting the one or more channels from the set of channels.

11. A device configured to be used in a wireless communication station capable of receiving user data, the device comprising:
a circuitry,
wherein the circuitry is configured to:
cause the wireless communication station to receive, from another station, a request to send (RTS) frame on each of a set of channels;
select one or more channels from the set of channels;
cause the wireless communication station to transmit, to the another station, a clear to send (CTS) frame on each of the selected one or more channels; and
cause the wireless communication station to receive, from the another station, a first frame comprising the user data using only the selected one or more channels among the set of channels,
wherein the RTS frame comprises bandwidth information which indicates a combined bandwidth of the set of channels.

12. The device of claim 11, wherein each of the set of channels is a 20 MHz band.

13. The device of claim 11, wherein the bandwidth information comprises two bits which indicate a bandwidth selected from a group of 20 MHz, 40 MHz, 80 MHz and 160 MHz.

14. The device of claim 11, wherein the RTS frame comprises information indicating that the another station supports a dynamic bandwidth operation.

15. The device of claim 11, wherein the CTS frame comprises bandwidth information which indicates a combined bandwidth of the selected one or more channels and information indicating that a second station transmitting the CTS frame is capable of selecting the one or more channels from the set of channels.

16. A communication method for transmitting user data, the method comprising:
transmitting, to a first station, a request to send (RTS) frame on each of a set of channels;
receiving, from the first station, a clear to send (CTS) frame on each of one or more channels selected by the first station among the set of channels; and
transmitting, to the first station, a first frame comprising the user data using only the selected one or more channels among the set of channels,
wherein the RTS frame comprises bandwidth information which indicates a combined bandwidth of the set of channels.

17. The communication method of claim 16, wherein each of the set of channels is a 20 MHz band.

18. The communication method of claim 16, wherein the bandwidth information comprises two bits which indicate a bandwidth selected from a group of 20 MHz, 40 MHz, 80 MHz and 160 MHz.

19. The communication method of claim 16, wherein the RTS frame comprises information indicating that the first station supports a dynamic bandwidth operation.

20. The communication method of claim 16, wherein the CTS frame comprises bandwidth information which indicates a combined bandwidth of the selected one or more channels and information indicating that a second station transmitting the CTS frame is capable of selecting the one or more channels from the set of channels.

21. An apparatus for transmitting user data, the apparatus comprising:
a circuitry,
wherein the circuitry is configured to:
cause the apparatus to transmit, to a first station, a request to send (RTS) frame on each of a set of channels;
cause the apparatus to receive, from the first station, a clear to send (CTS) frame on each of one or more channels selected by the first station among the set of channels; and
cause the apparatus to transmit, to the first station, a first frame comprising the user data using only the selected one or more channels among the set of channels,
wherein the RTS frame comprises bandwidth information which indicates a combined bandwidth of the set of channels.

22. The apparatus of claim 21, wherein each of the set of channels is a 20 MHz band.

23. The apparatus of claim 21, wherein the bandwidth information comprises two bits which indicate a bandwidth selected from a group of 20 MHz, 40 MHz, 80 MHz and 160 MHz.

24. The apparatus of claim 21, wherein the RTS frame comprises information indicating that the first station supports a dynamic bandwidth operation.

25. The apparatus of claim 21, wherein the CTS frame comprises bandwidth information which indicates a combined bandwidth of the selected one or more channels and information indicating that a second station transmitting the CTS frame is capable of selecting the one or more channels from the set of channels.

26. A device configured to be used in a wireless communication station capable of transmitting user data, the device comprising:
a circuitry,
wherein the circuitry is configured to:
cause the wireless communication station to transmit, to another station, a request to send (RTS) frame on each of a set of channels;
cause the wireless communication station to receive, from the another station, a clear to send (CTS) frame on each of one or more channels selected by the first another station among the set of channels; and
cause the wireless communication station to transmit, to the another station, a first frame comprising the user data using only the selected one or more channels among the set of channels,
wherein the RTS frame comprises bandwidth information which indicates a combined bandwidth of the set of channels.

27. The device of claim 26, wherein each of the set of channels is a 20 MHz band.

28. The device of claim 26, wherein the bandwidth information comprises two bits which indicate a bandwidth selected from a group of 20 MHz, 40 MHz, 80 MHz and 160 MHz.

29. The device of claim 26, wherein the RTS frame comprises information indicating that the another station supports a dynamic bandwidth operation.

30. The device of claim 26, wherein the CTS frame comprises bandwidth information which indicates a combined bandwidth of the selected one or more channels and information indicating that a second station transmitting the CTS frame is capable of selecting the one or more channels from the set of channels.

31. The communication method of claim 1, wherein all of the selected one or more channels are used to receive the user data from the first station.

32. The apparatus of claim 6, wherein all of the selected one or more channels are used to receive the user data from the first station.

33. The device of claim 11, wherein all of the selected one or more channels are used to receive the user data from the another station.

34. The method of claim 16, wherein all of the selected one or more channels are used to transmit the user data to the first station.

35. The apparatus of claim 21, wherein all of the selected one or more channels are used to transmit the user data to the first station.

36. The device of claim 26, wherein all of the selected one or more channels are used to transmit the user data to the another station.

37. The communication method of claim 1, wherein a number of channels in the set of channels is greater than a number of channels in the selected one or more channels.

38. The apparatus of claim 6, wherein a number of channels in the set of channels is greater than a number of channels in the selected one or more channels.

39. The device of claim 11, wherein a number of channels in the set of channels is greater than a number of channels in the selected one or more channels.

40. The device of claim 16, wherein a number of channels in the set of channels is greater than a number of channels in the selected one or more channels.

41. The apparatus of claim 21, wherein a number of channels in the set of channels is greater than a number of channels in the selected one or more channels.

42. The device of claim 26, wherein a number of channels in the set of channels is greater than a number of channels in the selected one or more channels.

43. The communication method of claim 1, further comprising transmitting a second frame to the first station, wherein the second frame comprises information indicating a number of streams.

44. The communication method of claim 43, wherein the first frame is transmitted from the first station based on the information indicating a number of streams.

45. The communication method of claim 44, wherein the first frame comprises information indicating a signal to noise ratio.

46. The apparatus of claim 6, wherein the circuitry is further configured to cause the apparatus to transmit a second frame to the first station, wherein the second frame comprises information indicating a number of streams.

47. The apparatus of claim 46, wherein the first frame is transmitted from the first station based on the information indicating a number of streams.

48. The apparatus of claim 47, wherein the first frame comprises information indicating a signal to noise ratio.

49. The device of claim 11, wherein the circuitry is further configured to cause the wireless communication station to transmit a second frame to the another station, wherein the second frame comprises information indicating a number of streams.

50. The device of claim 49, wherein the first frame is transmitted from the another station based on the information indicating a number of streams.

51. The device of claim 50, wherein the first frame comprises information indicating a signal to noise ratio.

52. The communication method of claim 16, further comprising receiving a second frame from the first station, wherein the second frame comprises information indicating a number of streams.

53. The communication method of claim 52, wherein the first frame is transmitted to the first station based on the information indicating a number of streams.

54. The communication method of claim 53, wherein the first frame comprises information indicating a signal to noise ratio.

55. The apparatus of claim 21, wherein the circuitry is further configured to cause the apparatus to receive a second frame from the first station, wherein the second frame comprises information indicating a number of streams.

56. The apparatus of claim 55, wherein the first frame is transmitted to the first station based on the information indicating a number of streams.

57. The apparatus of claim 56, wherein the first frame comprises information indicating a signal to noise ratio.

58. The device of claim 26, wherein the circuitry is further configured to cause the wireless communication station to receive a second frame from the another station, wherein the second frame comprises information indicating a number of streams.

59. The apparatus of claim 58, wherein the first frame is transmitted to the another station based on the information indicating a number of streams.

60. The apparatus of claim 59, wherein the first frame comprises information indicating a signal to noise ratio.

* * * * *